Figure 1:
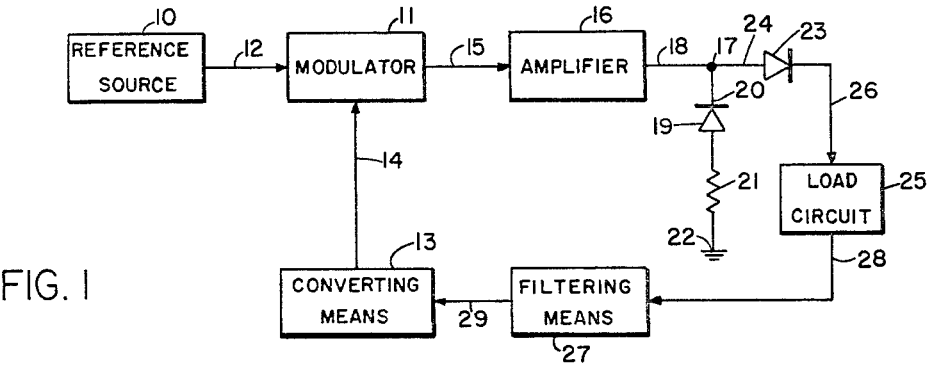

April 23, 1968  V. H. ASKE  3,379,979

CONTROL APPARATUS FOR PRODUCING CONSTANT ENERGY PULSES

Filed Dec. 23, 1963  2 Sheets-Sheet 1

INVENTOR.
VERNON H. ASKE
BY Roger W. Jensen
ATTORNEY

April 23, 1968     V. H. ASKE     3,379,979

CONTROL APPARATUS FOR PRODUCING CONSTANT ENERGY PULSES

Filed Dec. 23, 1963     2 Sheets-Sheet 2

INVENTOR.
VERNON H. ASKE

BY Roger W. Jensen

ATTORNEY ically ideal and the invention are not identical, and cannot simply be made to match one another.

United States Patent Office 3,379,979
Patented Apr. 23, 1968

3,379,979
CONTROL APPARATUS FOR PRODUCING CONSTANT ENERGY PULSES
Vernon H. Aske, Hopkins, Minn., assignor to Honeywell Inc., a corporation of Delaware
Filed Dec. 23, 1963, Ser. No. 332,723
6 Claims. (Cl. 328—59)

This invention pertains to a constant energy pulse source and more particularly, to an energy source capable of producing constant energy pulses in an extremely accurate manner for use in energizing torque generating devices or the like.

In prior art devices, a reference frequency source is utilized to maintain the frequency of the output pulses constant, and a reference voltage or current source is utilized to maintain the amplitude of the output pulses constant. The accuracy with which the output pulse energy is maintained constant, is directly dependent upon the accuracy with which the frequency of the reference frequency source and the voltage or current of the reference voltage or current source are maintained constant. Thus, two very accurate reference sources are utilized. In general, the output of the reference frequency source is applied to an amplifier or the like, the output amplitude of which is controlled by a DC voltage. The output pulses from the amplifier are applied to the load circuit it is desired to energize, and the pulses passing through the load circuit are then filtered to provide a varying amplitude signal. This varying amplitude signal is compared to the reference voltage or current source and the difference is applied to control the output of the amplifier. Thus, it can be seen that extreme accuracy is needed in both reference sources since a variation in one of the reference sources followed by a variation in the other reference source would produce an error in the energy of the output pulses.

In the present invention a single reference source is utilized to produce constant energy pulses thereby greatly simplifying the circuitry and increasing reliability and accuracy of the device. The single reference source, which may be a voltage or current source, is connected to a modulator, which also has a frequency input. The output of the reference source is modulated by the frequency input in the modulator to produce periodic signals having a relatively constant repetition rate and amplitude. This periodic signal is rectified and one-half of the signal is utilized as constant energy pulses to energize the load circuit. A filtering means is utilized which produces a varying amplitude output signal indicative of the average energy in the pulses passing through the load circuit. This filtering means may be connected in series with the load circuit, or it may be connected to receive the one-half of the rectified periodic signal not applied to the load circuit. The output of the filtering means is connected to a converting means which converts the varying amplitude signal to a varying frequency signal. This signal having a varying frequency indicative of the energy in the pulses applied to the load circuit is applied to the modulator as previously stated. Thus, if the energy content of the pulses applied to the load circuit increases, the repetition rate of the pulses is increased and, therefore, the width of the pulses decreases maintaining the energy in the pulses constant.

It is a primary object of this invention to provide an improved control apparatus.

It is a further object of this invention to provide an improved constant energy pulse source.

Figure 2:
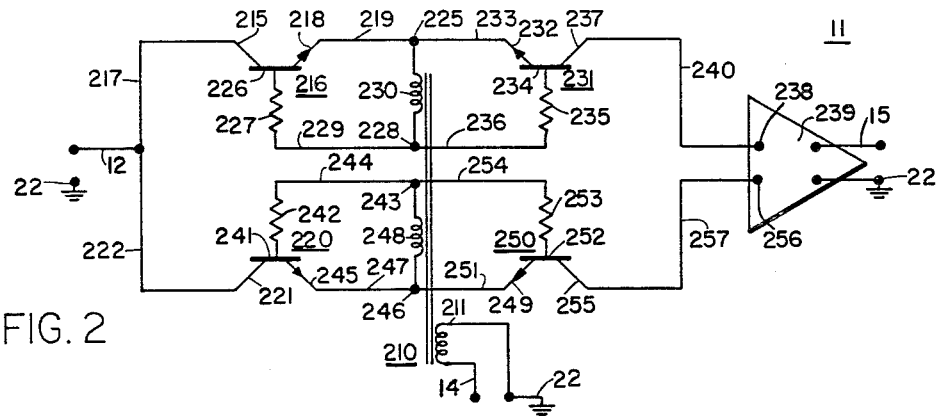
Figure 3:
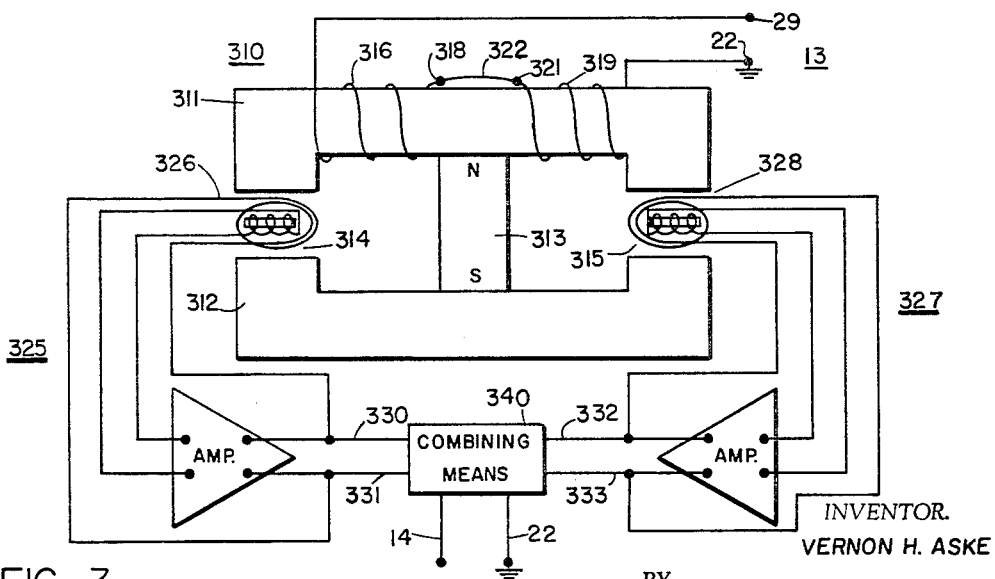
Figure 4:
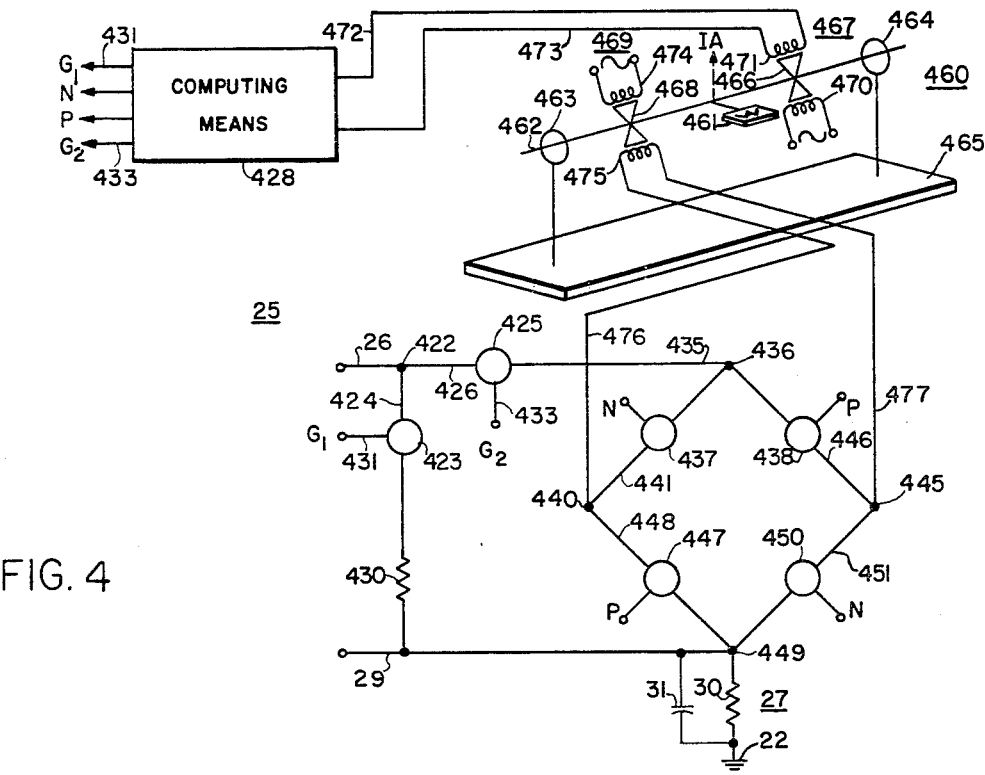
Figure 5:
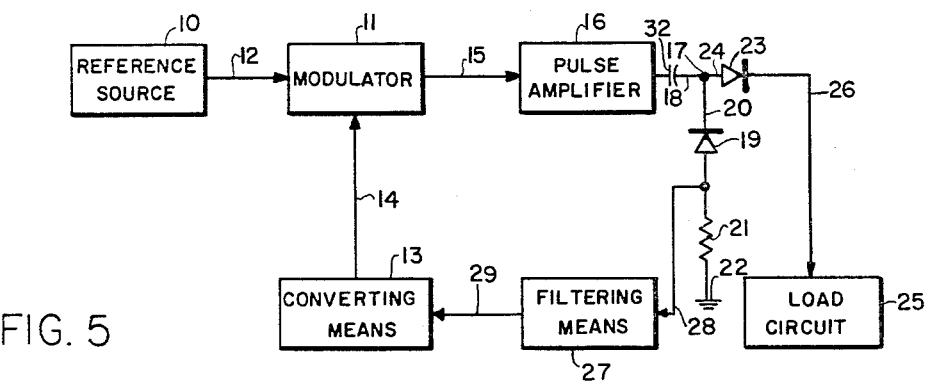

These and other objects of this invention will become apparent from the following description of a preferred form thereof and the accompanying specification, claims, and drawings, of which:

FIGURE 1 is a block diagram of the present invention;
FIGURE 2 is a schematic diagram of a modulator;
FIGURE 3 is a somewhat schematic diagram of a converting means;
FIGURE 4 is a somewhat schematic diagram of a load circuit; and
FIGURE 5 is a block diagram of an alternate embodiment of the present invention.

In FIGURE 1 a reference source 10 may be any constant energy source such as a constant current or a constant voltage source. Reference source 10 is connected to a modulator 11 by connecting means 12. Also connected to modulator 11 is a converting means 13. Converting means 13 produces an output signal having a frequency proportional to the amplitude of a signal applied to the input thereof. The output frequency of converting means 13 is applied to modulator 11 by a lead 14. One possible embodiment of modulator 11 is shown in FIGURE 2.

FIGURE 2 is a schematic diagram of a modulator that may be utilized for modulator 11 in FIGURE 1. This is simply one possible embodiment of a modulator which is shown for explanational purposes and is not to limit this invention in any way. In FIGURE 2, modulator 11 has a first input, designated 12, to indicate that it is connected to the reference source 10. A second input connected to the primary winding 211 of a transformer 210 is designated 14 to indicate that it is connected to the converting means 13. Both input 12 and input 14 have a second terminal which is connected to ground, designated numeral 22. Input 12 is connected to the collector 215 of a transistor 216 by a lead 217. Input 12 is also connected to the collector 221 of a transistor 220 by a lead 222. The emitter 218 of transistor 216 is connected to a junction point 225 by a lead 219. The base 226 of transistor 216 is connected through a resistor 227 to a junction point 228 by a lead 229. A secondary winding 230 of transformer 210 is connected between junction points 225 and 228. The emitter 232 of a transistor 231 is connected to junction point 225 by a lead 233. The base 234 of transistor 231 is connected through a resistor 235 to junction point 228 by a lead 236. The collector 237 of transistor 231 is connected to an input 238 of an amplifier 239 by a lead 240.

The base 241 of transistor 220 is connected through a resistor 242 to a junction point 243 by a lead 244. The emitter 245 of transistor 220 is connected to a junction point 246 by a lead 247. A secondary winding 248 of transformer 210 is connected between junction points 243 and 246. The emitter 249 of a transistor 250 is connected to junction point 246 by a lead 251. The base 252 of transistor 250 is connected through a resistor 253 to junction point 243 by a lead 254. The collector 255 of transistor 250 is connected to a second input 256 of amplifier 239 by a lead 257. The output of modulator 11 appears between a lead designated 15, which is connected to the output of amplifier 239 and ground 22.

In the operation of the modulator circuit 11, whenever the signal from the converting means 13 on lead 14 is positive with respect to ground, the voltage induced into the secondary winding 230 causes the emitters 218 and 232 of transistors 216 and 231, respectively, to be negative with respect to the bases 226 and 234. Thus, any signal appearing on the input lead 12 from the reference source 10 will pass through both conducting transistors 216 and 231 to the input 238 of amplifier 239. However, the voltage induced in the secondary winding 248 is such as to cause transistors 220 and 250 to be nonconducting and no signal passes therethrough. When the signal from converting means 13 on lead 14 is negative, with respect to ground, the voltage induced in the secondary winding 248 causes the emitters 245 and 249 to be negative with respect to the bases 241 and 252, and transistors 220 and 250 are both in a conducting state. Thus, any signal appearing on lead 12 from the reference source 10 will pass through both transistors to the input 256 of amplifier 239. When the signal on lead 14 is negative, the voltage induced in the secondary winding 230 causes transistors 216 and 231 to be nonconducting and no signal from the lead 12 passes therethrough. It should be noted that while the extreme conducting and nonconducting conditions of the transistors have been explained, any amount of conduction, from nonconduction to saturation, can be obtained by simply increasing the amplitude of the signal on lead 14. Thus, a modulator has been described which provides an output having a frequency dependent upon the frequency of the signal applied at lead 14 and an amplitude dependent upon the amplitude of the signal from the reference source 10. The described circuit is simply one embodiment that may be utilized and one skilled in the art could think of many modifications which are within the scope of the invention.

The modulator 11 is connected to an amplifier 16 by connecting means 15. Amplifier 16 may be an amplifier in addition to amplifier 239 of FIGURE 2, if extra power is needed, or the extra amplifier may be eliminated if amplifier 239 is sufficient. Amplifier 16 is connected to a junction point 17 by a lead 18. A diode 19 is connected to junction point 17 by a lead 20. The other side of diode 19 is connected through a resistor 21 to ground point 22. Diode 19 is connected in the circuit so that the negative half cycles of the sine wave appearing at junction point 17 are grounded. However, it should be understood that the negative half cycles of the sine waves could be utilized in the following circuitry, with a few minor changes, and the positive half cycles could be grounded if desired. A second diode 23 is connected to junction point 17 by a lead 24. The other side of diode 23 is connected to a load circuit 25 are applied to a filtering means 27 by a lead 28.

One embodiment of the load circuit 25 and the filtering means 27 is illustrated more clearly in FIGURE 4. It should be understood that this circuit is simply used for explanational purposes, and is not intended to limit the present invention in any way. The output pulses from the diode 23, shown in FIGURE 1, are applied to a junction point 422 by means of lead 26. Junction point 422 and the detailed drawing of the remainder of the load circuit and filtering means, illustrated in FIGURE 4, should now be regarded. A switch 423 is connected to junction point 422 by means of a lead 424. A switch 425 is connected to junction point 422 by means of a lead 426. Switch 423 when closed connects one side of a dummy load, shown as an impedance 430, to junction point 422. The other side of impedance 430 is connected to ground 22 through the filtering means 27. Filtering means 27 in this embodiment is illustrated simply as a resistor 30 and a capacitor 31 connected in parallel for convenience, but it should be noted that it could be any of a variety of networks. The activation of switch 423 is controlled by a signal which is supplied to the switch by means of a lead 431. Lead 431 receives this signal from computing means designated numeral 428. The lead 431 is not completed in FIGURE 4 for simplification of the drawing, but is simply indicated with the numeral 431, at the computing means 428. The activation of switch 425 is controlled by a signal applied to the switch by means of a lead 433. Lead 433 receives this activating signal from the computing means 428. The lead is not completed in FIGURE 4, but the connection is indicated by the designation $G_2$ at the switch 425 and at the output of the computing means 428. When the signal on lead 431 closes switch 423, the signal on lead 433 opens the switch 425. Switch 425 when activated connects lead 426 to a lead 435 which is connected to a junction point 436. Junction point 436 is connected directly to a first switch 437 and to a second switch 438. Switch 437 when activated connects junction point 436 to a junction point 440 by means of a lead 441. Switch 438 when activated connects junction point 436 to a lead 446 which is connected to a second junction point 445. Another switch 447 is connected to junction point 440 by means of a lead 448. When activated, switch 447 connects lead 448 to a junction point 449. Another switch 450 is connected to junction point 445 by means of a lead 451. When activated, switch 450 connects lead 451 to the junction point 449. Junction point 449 is connected to ground 22 through the filtering resistor 27. Switches 437, 438, 447, and 450 and the connections desired form a circuit known as a switching bridge.

Switch 437 of the switching bridge is activated by a signal on a lead designated N. The lead designated N is actually a connection to computing means 428 which has a similar lead designated N. This connection and similar connections to be explained have not been shown for simplification of FIGURE 4. Switch 450 is activated simultaneously with switch 437 when a signal appears on lead N. Switches 438 and 447 are activated simultaneously when a signal appears on a lead P. The lead P is also a connection to computing means 428. The computing means 428 may be any compilation of gating circuits and flip-flops which provide a signal on $G_1$ and $G_2$ to open switch 425 when switch 423 is closed, and open switch 423 when switch 425 is closed. Also, when switch 423 is open and switch 425 is closed, the computing means 428 must provide a signal either on the N lead or the P lead, but not both. Which switches will be activated is controlled by the magnitude and polarity of an input signal appearing on a pair of leads 472 and 473.

In FIGURE 4, the numeral 460 generally designates an inertial instrument, which in this particular embodiment is a pendulous accelerometer, shown schematically. Pendulous accelerometer 460 consists of a pendulous weight 461, fixedly attached to a shaft 462. Shaft 462 is supported for rotation by some bearing means 463 and 464 which are fixedly attached to the case 465 of accelerometer 460. An input axis, IA is mutually perpendicular to the pendulous weight 461 and the rotatable shaft 462. A rotor 466 of a signal generator 467 is fixedly attached to shaft 462 and rotates therewith. An excitation winding 470 of signal generator 467 is adapted to have an excitation voltage applied thereto. Upon proper excitation of winding 470, any movement of rotor 466 induces a signal into a pickoff winding 471 which is applied to computing means 428 by means of the pair of leads 472 and 473.

A rotor 468 of a torque generator 469 is fixedly attached to shaft 462 and rotates therewith. A pattern field winding 474 of torque generator 469, is adapted to have an energization voltage applied thereto. A second winding 475 of torque generator 469 is the excitation winding. If the pattern field winding 474 is properly energized, and an excitation signal appears on winding 475, a force is produced on rotor 468 which causes rotation of rotor 468 and shaft 462 in the desired direction. Excitation winding 475 of torque generator 469 is connected between junction points 440 and 445 of the switching bridge circuit by means of a pair of leads 476 and 477.

When the pendulous weight 461 of accelerometer 460 is in the null position, that is, no acceleration appears along the axis IA, no signal is induced in the secondary winding 471 of signal generator 467 and computing means 428 provides a signal on lead 431 ($G_1$) which closes switch 423. A signal is simultaneously provided on lead 433 ($G_2$) which opens switch 425. Thus, the positive pulses of current appearing at junction point 422 travel through switch 423, dummy load 430 and the filtering means 427 to ground 22.

If an acceleration appears along the IA axis in an upward direction, pendulous weight 461 has a force applied thereto and causes rotation of shaft 462 and therefore, rotor 466 in a clockwise direction, looking from bearing means 463 to bearing means 464. The rotation of rotor 466 induces a signal into the secondary winding 471 which is applied to computing means 428. Computing means 428 provides a signal on lead 431 ($G_1$) which opens switch 423 and, simultaneously, provides a signal on lead 433 (G₂) which closes switch 425. Computing means 428 also provides a signal on lead N which closes switches 437 and 450 and, simultaneously, provides a signal on lead P which opens switches 438 and 447. Thus, the pulses appearing at junction point 422 travel through switch 425, switch 437, excitation winding 475 of torque generator 469, switch 450, and filtering means 27 to ground.

If an acceleration appears along the IA axis in a downward direction, pendulous weight 461 has a force applied thereto and causes rotation of shaft 462 and, therefore, rotor 466 in a counterclockwise direction, looking from bearing means 463 to bearing means 464. The rotation of rotor 466 induces a signal into the secondary winding 471 which is applied to computing means 428. Computing means 428 provides a signal on lead 431 (G₁) which opens switch 423 and, simultaneously, provides a signal on lead 433 (G₂) which closes switch 425. Computing means 428 also provides a signal on lead N which opens switch 437 and 450 and, simultaneously, provides a signal on lead P which closes switches 438 and 447. Thus, the pulses appearing at junction point 422 travel through switch 425, switch 438, excitation winding 475 of torque generator 469, switch 447, and filtering means 27 to ground.

The current passing through excitation winding 475 is traveling in the opposite direction in the second example, and thus, produces a rotation of rotor 468 and shaft 462 in the opposite direction. Therefore, it can be seen that by applying the proper number of pulses appearing at junction point 422 to the excitation winding 475 of torque generator 469, and by applying these pulses in the proper direction, a torque on shaft 462 is produced which will maintain the pendulous mass 461 at a null position.

All of the pulses appearing at junction point 422 pass through the filtering means 27 to ground 22, whether they travel by way of the dummy load 430 or the excitation winding 475 of the torque generator 469. Thus, the filtering means 27 has a voltage appearing across it which is indicative of the average energy in the pulses appearing at the junction point 422. The voltage appearing across the filtering means 27 is applied to the input of converting means 13 by a lead designated 29 (see FIGURE 1). Converting means 13 is a device which produces an accurate output frequency indicative of the variations in amplitude of the input signal. Converting means 13 may be a device such as a voltage controlled oscillator or a nuclear magnetic resonance (NMR) current to frequency converting device.

A suitable current to frequency converting device for use in the present invention is disclosed in a copending application, Ser. No. 135,219, filed Aug. 31, 1961, in the name of Barret Doyle and assigned to the same assignee. Referring to FIGURE 3, a converting means 13 utilizing a pair of NMR spin generators is illustrated. A complete explanation of the NMR principles can be found in a patent Re. 23,950 issued to F. Block et al., on February 22, 1955. FIGURE 3 shows a magnetic device for producing two variable magnetic fields, which is designated by numeral 310. Magnetic device 310 is comprised of two C-shaped magnetic members 311 and 312. C-shaped members 311 and 312 are composed of some relatively permeable magnetic material to reduce hysteresis and may be laminated to reduce eddy currents. A magnet 313 is connected to each of the C-shaped members at approximately the center of the members. Magnet 313 is shown as a permanent magnet for simplicity, but it could be an electromagnet or any other means for producing a relatively constant magnetic flux. Magnet 313 may be connected to C-shaped members 311 and 312 by any convenient means such as bonding. Magnet 313 joins C-shaped members 311 and 312 so as to provide two approximately equal air gaps 314 and 315 between the ends of the C-shaped members. It can be seen that since the magnet 313 is approximately in the center of C-shaped member 311 and C-shaped member 312, substantially equal flux will flow across air gap 314 and air gap 315.

A winding 316 is wound about a portion of C-shaped member 311 between magnet 313 and air gap 314. Winding 316 has a terminal 29 and a terminal 318. A second winding 319 is wound about a portion of C-shaped member 311 between magnet 313 and air gap 315. Winding 319 has a terminal 321 and the other side of the winding is connected to ground 22. Terminal 318 of winding 316 and terminal 321 of winding 319 are connected together by a lead 322. Thus, winding 316 and winding 319 are connected in series, and a single current may be applied to the two windings between terminal 29 and ground.

In FIGURE 3, the north pole of magnet 313 is joined to C-shaped member 311, and the south pole of magnet 313 is joined to C-shaped member 312. Winding 316 is wound around C-shaped member 311 so that when a current is applied to the terminal 29, assuming terminal 29 is positive, the flux produced by winding 316 subtracts from the flux produced by magnet 313 to decrease the flux across air gap 314. Winding 319 is wound around C-shaped member 311 so that when the current is applied to the terminal 29, the flux produced by winding 319 adds to the flux produced by magnet 313 to increase the flux across air gap 315. Thus, a current applied to the terminal 29 has a push-pull effect in decreasing the flux in one air gap and increasing the flux in the other air gap.

Numeral 325 designates an NMR device which has its sensitive windings 326 mounted within air gap 314. Numeral 327 designates an NMR device which has its sensitive windings 328 mounted within air gap 315. NMR devices 325 and 327 may be of a spin generator, marginal oscillator, or any of a variety of nuclear magnetic resonant devices. One such device is explained in an application by Abrahamson et al., Ser. No. 118,704, filed June 21, 1961, and assigned to the same assignee. The output of the NMR device 325 appears on a pair of leads 330 and 331 and is a signal having a frequency proportional to the magnetic flux in air gap 314. The output of the NMR device 327 appears on a pair of leads 332 and 333, and is a signal having a frequency proportional to the magnetic flux in air gap 315. A combining means 340 receives the signals on leads 330–331, and 332–333 and provides an output between lead 14 and ground 22 which is indicative of the difference in frequency between the output signal from the NMR device 325 and the output signal from the NMR device 327.

The output from the converting means 13 is a frequency which follows any variations in the average energy of the pulses applied to the load circuit 25. The signal from the converting means 13 is applied to control the modulator 11 by means of lead 14, as previously explained. Thus, a device has been described which utilizes one reference source to provide pulses having a constant energy content.

A second embodiment of the present invention is shown in FIGURE 5. The same numbers have been used in FIGURE 5 as in FIGURE 1 to illustrate the similarity between the two circuits. In FIGURE 5, the negative pulses appearing across the resistor 21, connected between diode 19 and ground 22, are applied to the filtering means 27 by means of lead 28. A capacitor 32 has been placed in series between the amplifier 16 and the junction point 17 to eliminate any DC level and assure the average energy content of the positive pulses is equal to that of the negative pulses. The remainder of the circuit is the same as in FIGURE 1. In this embodiment the signal on lead 28 is an indication of the average energy content in the negative pulses. However, since the positive and negative pulses of the signal appearing at junction point 17 have the same average energy content the negative pulses vary the same as the positive pulses, thus, any variations in the average energy content of the positive pulses passing through the load circuit are compensated in a fashion similar to that explained for the previous embodiment except the negative pulses are utilized.

The invention described utilizes a single reference source to provide pulses having a constant energy content. This greatly simplifies the constant energy pulse source thereby greatly increasing the reliability and accuracy.

While I have shown and described a specific embodiment of this invention, further modifications and improvements will occur to those skilled in the art. I desire to be understood, therefore, that the invention is not limited to the particular form shown and I intend in the appended claims to cover all modifications which do not depart from the spirit and scope of this invention.

I claim as my invention:

1. Apparatus for producing constant energy pulses comprising: a reference source providing an output signal having a substantially constant magnitude; converting means for converting a varying magnitude input signal to an output signal having a frequency which varies relative to the magnitude of said input signal; modulator means connected to receive said output signal from said reference source and said output signal from said converting means and providing a signal the magnitude of which is dependent upon said output from said reference source and the frequency of which is dependent upon the output signal from said converting means; a load circuit connected to receive said signal provided by said modulator means; filtering means connected to receive the signal applied to said load circuit and providing a signal indicative of the average energy content of the signal applied to said load circuit means connecting said signal provided by said filtering means to said converting means.

2. Apparatus for producing constant energy pulses comprising: a reference source providing an output signal having a substantially constant magnitude; converting means for converting a varying magnitude input signal to an output signal having a frequency which varies relative to the magnitude of said input signal; modulator means connected to receive said output signal from said reference source and said output signal from said converting means and providing a signal the magnitude of which is dependent upon said output from said reference source and the frequency of which is dependent upon the output signal from said converting means; rectifying means connected to receive said signal from said modulator means and providing unipolarity output pulses; a load circuit connected to receive said output pulses; filtering means connected to receive pulses indicative of the electrical energy applied to said load circuit and providing a signal indicative of the average energy content thereof; and means connecting said signal provided by said filtering means to said converting means.

3. Apparatus for producing constant energy pulses comprising: a reference source providing an output signal having a substantially constant magnitude; nuclear magnetic resonance converting means for converting a varying magnitude input signal to an output signal having a frequency which varies relative to the magnitude of said input signal; modulator means connected to receive said output signal from said reference source and said output signal from said converting means and providing a signal the magnitude of which is dependent upon said output from said reference source and the frequency of which is dependent upon the output signal from said converting means; a load circuit connected to receive said signal provided by said modulator means; filtering means connected to receive the signal applied to said load circuit and providing a signal indicative of the average energy content of the signal applied to said load circuit; and means connecting said signal provided by said filtering means to said converting means.

4. Apparatus for producing constant energy pulses comprising: a reference source providing an output signal having a substantially constant magnitude; nuclear magnetic resonance converting means for converting a varying magnitude input signal to an output signal having a frequency which varies relative to the magnitude of said input signal; modulator means connected to receive said output signal from said reference source and said output signal from said converting means and providing a signal the magnitude of which is dependent upon said output from said reference source and the frequency of which is dependent upon the output signal from said converting means; rectifying means connected to receive said signal from said modulator means and providing unipolarity output pulses; a load circuit connected to receive said output pulses; filtering means connected to receive pulses indicative of the electrical energy applied to said load circuit and providing a signal indicative of the average energy content thereof; and means connecting said signal provided by said filtering means to said converting means.

5. Apparatus for producing constant energy pulses comprising: a reference source providing an output signal having a substantially constant magnitude; converting means for converting a varying magnitude input signal to an output signal having a frequency which varies relative to the magnitude of said input signal; modulator means connected to receive said output signal from said reference source and said output signal from said converting means and providing a signal the magnitude of which is dependent upon said output from said reference source and the frequency of which is dependent upon the output signal from said converting means; rectifying means connected to receive said signal from said modulator means and providing first and second unipolarity output pulses; a load circuit connected to receive said first output pulses; filtering means connected to receive said second output pulses and providing a signal indicative of the average energy content of said second output pulses; and means connecting said signal provided by said filtering means to said converting means.

6. Apparatus for producing constant energy pulses comprising: a reference source providing an output signal having a substantially constant magnitude; nuclear magnetic resonance converting means for converting a varying magnitude input signal to an output signal having a frequency which varies relative to the magnitude of said input signal; modulator means connected to receive said output signal from said reference source and said output signal from said converting means and providing a signal the magnitude of which is dependent upon said output from said reference source and the frequency of which is dependent upon the output signal from said converting means; rectifying means connected to receive said signal from said modulator means and providing first and second unipolarity output pulses; a load circuit connected to receive said first output pulses; filtering means connected to receive said second output pulses and providing a signal indicative of the average energy content of said second output pulses; and means connecting said signal provided by said filtering means to said converting means.

No references cited.

ALFRED L. BRODY, *Primary Examiner.*